(No Model.)
W. HOLLAND.
PITCH GAGE FOR BEVEL GEARS.
No. 486,042. Patented Nov. 8, 1892.
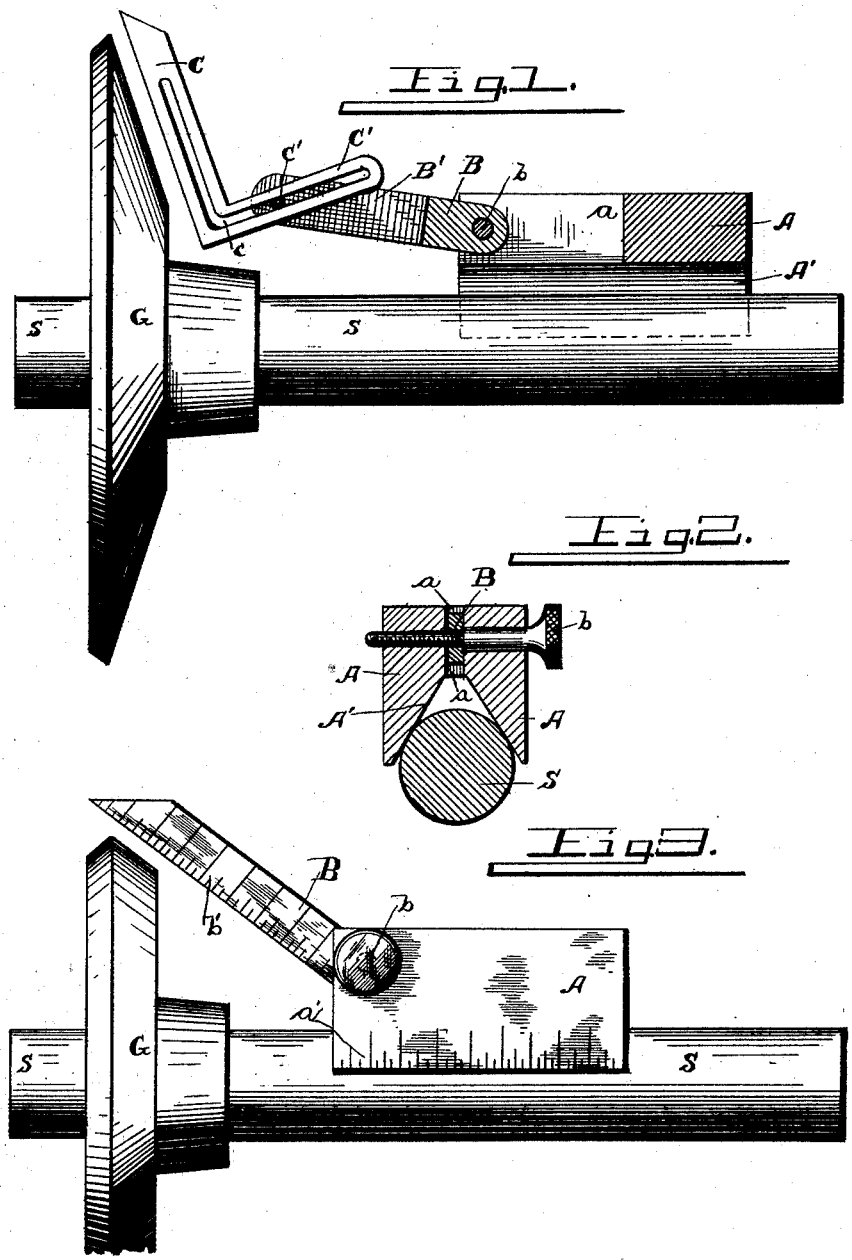

UNITED STATES PATENT OFFICE.

WILLIAM HOLLAND, OF SOUTH BEND, INDIANA, ASSIGNOR OF ONE-HALF TO JOSEPH ZAEHULE.

PITCH-GAGE FOR BEVEL-GEARS.

SPECIFICATION forming part of Letters Patent No. 486,042, dated November 8, 1892.

Application filed December 12, 1891. Serial No. 414,859. (No model.)

*To all whom it may concern:*

Be it known that I, WILLIAM HOLLAND, of South Bend, in the county of St. Joseph and State of Indiana, have invented certain new and useful Improvements in Pitch-Gages for Bevel-Gears, &c.; and I do hereby declare that the following is a full, clear, and exact description thereof, reference being had to the accompanying drawings, and to the letters of reference marked thereon, which form part of this specification, in which—

Figure 1 is a longitudinal vertical section through my improved pitch-gage. Fig. 2 is a transverse sectional view of the same. Fig. 3 is a side view illustrating a modification.

This invention is an improvement in pitch-gages for determining the inclination or pitch of the wearing-surfaces of bevel-gears and friction-cones, &c., and for other similar purposes; and it consists in the novel combination and construction of parts, as will be hereinafter fully described and claimed.

Referring to the drawings by letters, A designates a block having a longitudinal V-shaped groove A' in its lower surface, which is adapted to partly embrace or receive a shaft, and thus cause the block to automatically adjust and align itself upon and with the shaft S, upon which the bevel-gear G or other object to be worked is mounted. Block A has a vertical slot $a$ in one extremity perpendicular to shaft S, in which is fitted the end of an adjustable rule B, which is secured therein by an adjusting-screw $b$, having a threaded inner end engaging a threaded recess in one side of block A and shouldered on its other side, so that when screwed home the shoulder catches the side of rule B and binds the latter to the block, as indicated in Fig. 2. This rule B is preferably provided with linear scale-marks on its sides, as indicated at $b'$ in Fig. 3, and block A is likewise provided with linear scale-marks, as shown at $a'$.

The free end of rule B, as shown in Fig. 1, is vertically and longitudinally slotted, as at B', to receive the short arm C' of gage C, said gage, as shown in Fig. 1, being L-shaped and having an L-shaped slot $c$, extending into both arms, transfixed by a thumb-screw $c'$, passing through the end of rule B and by which the gage may be locked in any position on rule B to which it may be adjusted. The arms of the gage are provided with linear scales, as indicated in the drawings.

When the gear or cone has a projecting hub, as in Fig. 1, or a double beveled or inclined surface, the rule B and gage C are generally necessary, in order to enable the latter to be set against the periphery of the gear; but when there is no projecting hub, but simply a straight incline, the gage C may be removed, as the pitch can be found by the employment of rule B alone, as indicated in Fig. 3.

In use the rule B or gage C is first adjusted so that its outer lower edge stands at the exact incline to the lower edge of block A that it is desired to make the pitch of the gear, &c., in relation to its axis. The block A is then set on the shaft, the groove A' fitting thereon, as indicated in Fig. 2, and aligning the block therewith. Then the block is slid toward the gear or other object being worked on, bringing the edge of the rule or gage against the edge of the gear and enabling the workman at once to determine whether such edge is properly beveled or not, as indicated in the drawings. The width of the beveled surface can also be determined simultaneously with its pitch. By the employment of this device it is not necessary to stop the rotation of the shaft, and as the block A rests accurately thereon if the shaft be in true alignment the centering of the gear on the shaft may also be determined. With this device nothing is left to the eye of the workman, and he can keep the gage on the shaft even while planing off the bevel-surface.

I am aware that drill-gages have been made with V-shaped guides and double adjustable blades, but different in construction and purpose from my invention.

Having described my invention, what I claim as new, and desire to secure by Letters Patent thereon, is—

The combination of the grooved block, the rule adjustably connected to one end thereof, and the slotted angular gage adjustably connected to the free end of said piece, substantially as and for the purpose specified.

In testimony that I claim the foregoing as my own I affix my signature in presence of two witnesses.

WILLIAM HOLLAND.

Witnesses:
JAMES DuShane,
JOSEPH E. ZAEHULE.